United States Patent [19]
Ando et al.

[11] Patent Number: 5,345,767
[45] Date of Patent: Sep. 13, 1994

[54] VIBRATION MOTOR

[75] Inventors: Mitsuhiro Ando, Tokyo; Tomokimi Mizuno, Chiryu; Yoshihiro Naruse, Ichikawa; Iwao Fujimasa, Hino, all of Japan

[73] Assignee: Aisin Seiki Kabushiki Kaisha, Asahi, Japan

[21] Appl. No.: 845,428

[22] Filed: Mar. 4, 1992

[30] Foreign Application Priority Data

Mar. 5, 1991 [JP] Japan .................... 3-038628

[51] Int. Cl.⁵ .................................. F03G 7/00
[52] U.S. Cl. .......................... 60/721; 74/129
[58] Field of Search ............ 60/527, 528, 529, 721; 310/351; 74/126, 128, 129

[56] References Cited

U.S. PATENT DOCUMENTS

| | | | |
|---|---|---|---|
| 1,258,368 | 3/1918 | Smith | 60/529 |
| 2,572,162 | 10/1951 | Koonz | 60/529 X |
| 2,875,621 | 3/1959 | Peters | 74/129 X |
| 3,430,441 | 3/1969 | Adams | 60/529 |
| 4,325,264 | 4/1982 | Sashida | 74/128 X |
| 4,335,853 | 6/1982 | Szemeredi et al. | 74/129 X |
| 4,663,556 | 5/1987 | Kumada | 310/333 |

FOREIGN PATENT DOCUMENTS

| | | |
|---|---|---|
| 58-32518 | 7/1983 | Japan . |
| 60-148386 | 8/1985 | Japan . |
| 60-148388 | 8/1985 | Japan . |
| 61-52168 | 3/1986 | Japan . |

*Primary Examiner*—Stephen F. Husar
*Attorney, Agent, or Firm*—Finnegan, Henderson, Farabow, Garrett and Dunner

[57] ABSTRACT

A vibration motor comprises a first member for receiving an external vibration, a second member set to be brought into collision with the first member as a result of the receipt of the external vibration, and a converting mechanism provided at the first member and/or the second member and having an asymmetric configuration for establishing a relative movement of the second member upon collision of the first member thereto.

10 Claims, 11 Drawing Sheets

VIBRATION MOTOR

BACKGROUND OF THE INVENTION

The present invention relates to a vibration motor and in particular to a vibration motor which makes a rotational or linear movement in response to an external vibration.

A conventional vibration motor is well known as an ultrasonic motor wherein a moving member is brought into a rotational or linear movement by a vibration from a piezoelectric element.

However, in light of the fact that the foregoing movement is too small to be practical use and a rigorous accuracy is required in the combination between the piezoelectric element and the moving member, the ultrasonic motor seems not to be fitted for various purposes.

SUMMARY OF THE INVENTION

It is, therefore, a primary object of the present invention to provide an improved vibration motor without the foregoing drawbacks.

It is another object of the present invention to provide a vibration motor in which a desired movement of a moving member can be obtained.

It is another object of the present invention to provide a vibration motor which can be be fitted for various purposes.

In order to attain the foregoing objects, a vibration motor is comprised of a first member for receiving an external vibration, a second member set to be brought into collision with the first member as a result of the receipt of the external vibration, and a converting mechanism provided at the first member and/or the second member and having an asymmetric configuration for establishing a relative movement of the second member upon collision of the first member thereto.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

First Embodiment

Figure 1:
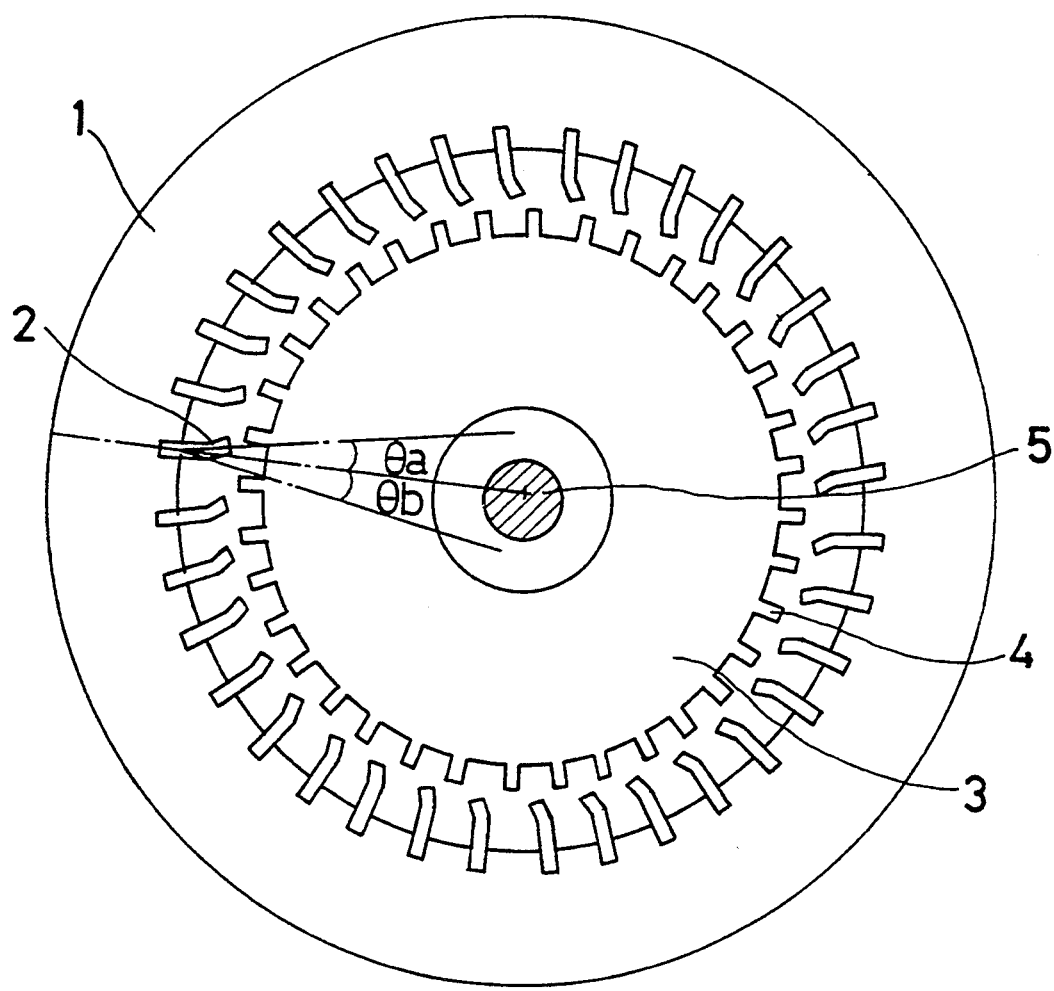
FIG. 1 is a plane view of a first embodiment of a vibration motor in accordance with the present invention.

In FIG. 1, there is illustrated the first embodiment of the present invention. A vibration motor includes an annular flat ring 1 which is secured at its inner periphery with a plurality of equally pitched bimetals 2. Each bimetal 2 is set to be projected along the radial line of the ring 1. A distal end of the bimetal 2 is bent in the clockwise direction through an angle above $\theta$ a with respect to the radial line when a temperature of the ring 1 is equal to or less than T1. On the other hand, when the temperature is above T2 which is higher than T1, the bimetal 2 is turned or bent in the clockwise direction through an angle above $\theta$ b.

With an inner space of the ring 1, there is provided or disposed a rotor 3 which is provided at its outer periphery with a plurality of equally pitched projections 4 opposing the corresponding bimetals 2. A shaft 5 is secured to the rotor 3. In this embodiment, the shaft 5 is so designed as to be an output shaft which is supported by bearing means (not shown). Though this permits a rotation of the rotor 3, no substantial vibration is established at the rotor 3 Contrary to this, though the ring 1 fails to rotate, the ring 1 is set to be supported by a casing (not shown) so as to be vibrational in a direction which is in parallel to or along a paper on which the vibration motor having the foregoing components is illustrated.

Under a condition that the distal end of the bimetal 2 is bent through the angle $\theta$ a in the clockwise direction as shown in FIG. 1, when the ring 1 is applied with a vibration which is in parallel with the paper showing FIG. 1, the bimetal 2 of the ring 1 is brought into abutment with the respective projection 4 of the rotor 3. Due to the fact that the distal end of the bimetal 2 is out of alignment with the radial line of the the ring 1 or the rotor 3, the resulting abutment applies a force to the projection 4 in the counter-clockwise direction, thereby rotating the rotor 3 in the counter-clockwise direction. When the temperature exceeds T2, due to the bending angle $\theta$ b of the distal end of the bimetal 2 in the counter-clockwise direction, the rotor 3 is rotated in the clockwise direction. Instead of the bimetal 2, another member such as a shape memory effect alloy whose shape is deformable in response to or depending on its temperature is available.

Figure 2A:
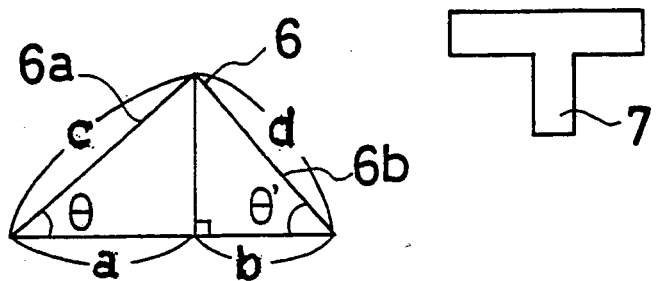
FIGS. 2(a), 2(b) and 2(c) each of which shows an operation principle of a vibration motor shown in FIG. 1.
Figure 2B:
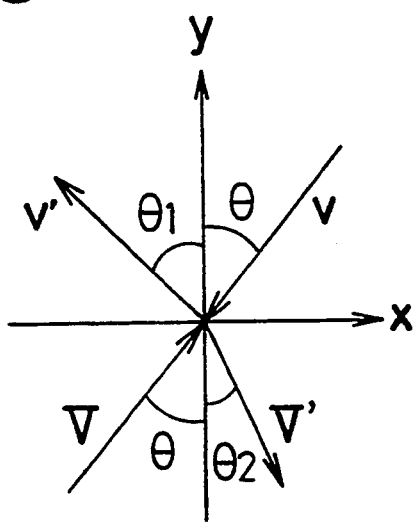
Figure 2C:
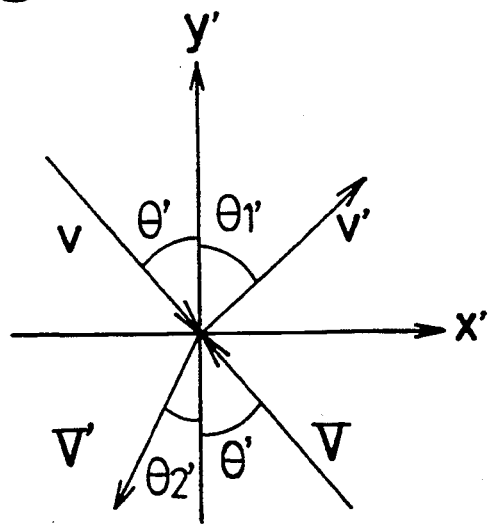

The following is an explanation of a principle why the foregoing rotation is established. Referring to FIGS. 2(a), 2(b) and 2(c), assuming that a lower tooth 6 corresponding to the bimetal 3 is brought into abutment or collision with an upper tooth 7 corresponding to the projection 4, upon abutment of the upper tooth 7 on an oblique side 6a (an oblique side 6b), a dynamic relationship therebetween can be shown in FIG. 2(b) (FIG. 2(c)).

Assuming that m ($\rho$) is a mass, v (V) is an absolute velocities before collision, $\theta$ ($\theta$) is an incidence angle before collision, v' (V') is an absolute velocity after collision and $\theta 1$ ($\theta 2$) is a reflection angle after collision of the upper tooth 7 (lower tooth 6), upon collision of the upper tooth 7 on the oblique side 6a of the lower tooth 6, due to the law of conservation of momentum, with respect to x-direction, a formula of $$-mv \sin \theta + \rho \, V \sin \theta = -mv' \sin \theta \, 1 + \rho \, V' \sin \theta \, 2 \quad (1)$$

is established.

Similarly, with respect to y direction, a formula of $$-mv \cos \theta + \rho V \cos \theta = -mv' \cos \theta \, 1 + \rho \, V' \cos \theta 2 \quad (2)$$

is established.

If a coefficient of restitution is defined as e, a formula of $$v' \cos \theta \, 1 + V' \cos \theta \, 2 = e(v \cos \theta + V \cos \theta) \quad (3)$$

is established.

A collision force Ix in x-direction is obtained as follows:

$$Ix = (\rho \, V - mv) \sin \theta \quad (A)$$

This means that the impulse of the upper tooth in x-direction depends on the mass m of the upper tooth 7 and the mass $\rho$ of the lower tooth 6. Upon collision of the upper tooth 7 with the oblique side 6b of the lower tooth 6, a collision force Iy in y-direction is obtained as follows:

$$Iy = (\rho \, V - mv) \sin \theta ' \ldots \quad (A)$$

If the upper tooth 7 and the lower tooth 6 are of the shapes or the configurations respectively shown in FIG. 2(a), the relative movement therebetween is established in the horizontal direction and the direction of the vibration is perpendicular to a bottom side of the lower tooth 6, the ratio of the number of the collisions of the upper tooth 7 with the side 6a to those with the side 6b can be expressed as a/(a+b): b/(a+b). If the total number of the collisions is let to be L, the number of the collisions of the upper tooth 7 with the side 6a becomes aL/(a+b) and the collisions of the upper tooth 7 with the side 6b becomes bL/(a+b), From the foregoing formulas (A) and (B), The impulse differential $\Delta Ix$ is obtained as follows:

$$\begin{aligned}\Delta Ix &= [aL/(a + b)]|\rho V - mv|\sin\theta - \\ & \quad [bL/(a + b)]|\rho V - mv|\sin\theta' \\ &= [|\rho V - mv|/L(a + b)](a\sin\theta - b\sin\theta')\end{aligned}$$

At this time, if tooth 6 and the upper tooth 7 are vibrated by the external vibrations of $y1 = B\sin(\omega' t + \beta)$ and $y0 = yc + A\sin(\omega t + \alpha)$, respectively, the following two formulas are obtained.

$$V = A\omega\cos(\omega t + \alpha) \ldots \quad (D)$$

$$v = B\omega' \cos(\omega' t + \beta) \ldots \quad (E)$$

Figure 3:
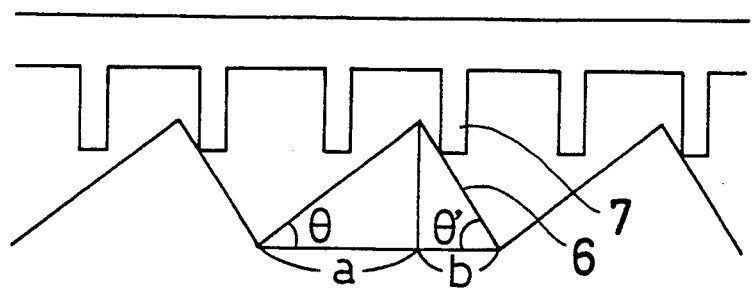
FIG. 3 is a view showing in the relationship between opposing teeth in a vibration motor shown in FIG. 1.

As shown in FIG. 3 wherein N pieces of lower teeth 6 are in opposition to M pieces of upper teeth 7 wherein the pitch between two adjacent ones is set to be 1, if the lowest common multiple with respect to 1 and a+b and the integer not less than $\chi$ are set to be defined as LCM(1, a+b) and [$\chi$], respectively, the number of positions at which collisions are established between each upper tooth 7 and each lower tooth 6 is defined from a formula of $$\begin{aligned}&[M(a+b)/\ LCM(1,a+b)] \text{ or} \\ &[N1(a+b)/LCM(1,a+b)]\end{aligned} \quad (F)$$

From the foregoing formulas (C), (D), (E) and (F), the following is obtained, $$\Delta Ix = |A \rho \, \omega \cos(\omega t + \alpha) - B \, m \, \omega'\cos(\omega' t + \beta)|/(A + B) \times \quad (G)$$

$$[M(a + b)/LCM((1,a + b)] \times (a\sin\theta - b\sin\theta')$$

Assuming that weights of the upper teeth 7 and the lower teeth 6 are set to be W' and W, respectively, the following is obtained, $$\Delta Ix = |A(W'/Mg)\omega \cos(\omega t + \alpha) - \quad (G)$$

$$B(W/Ng)\omega'\cos(\omega' t + \alpha)|/(A + B) \times$$

$$[M(a + b)/LCM((1,a + b)] \times (a\sin\theta - b\sin\theta')$$

Thus, the resultant impulse establishes a relative movement between the lower teeth 7 and the upper teeth 6, and its direction is depended on the value defined as (a sin $\theta$ −b sin $\theta$') which is derived from the asymmetric shape ($\theta \ne \theta$') of each lower tooth 6.

The foregoing formula (G) can be established if the upper tooth 7 is vibrated by other external vibration of $y1 = \Sigma Bi \sin[(\omega i't + \beta)]$ or $y2 = \Sigma[yic + Ai \sin(\omega it + \alpha i)]$ which enables the foregoing relative movement regard less of any vibration so long as the asymmetric shape of each lower tooth 6 is being established.

The foregoing embodiment shown in FIG. 1 is so designed as to obtain a rotational movement.

Second Embodiment

Figure 4:
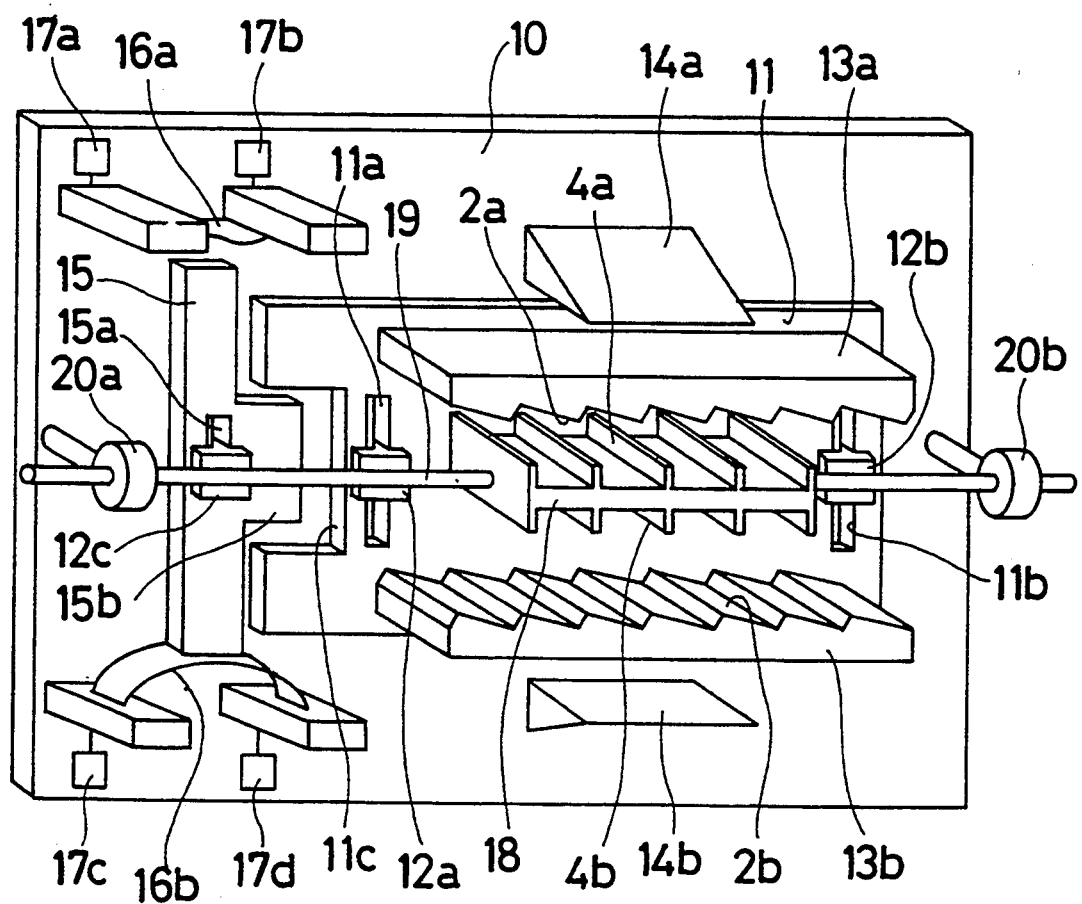
FIG. 4 is a perspective view of a second embodiment of a vibration motor in accordance with the present invention.
Figure 5:
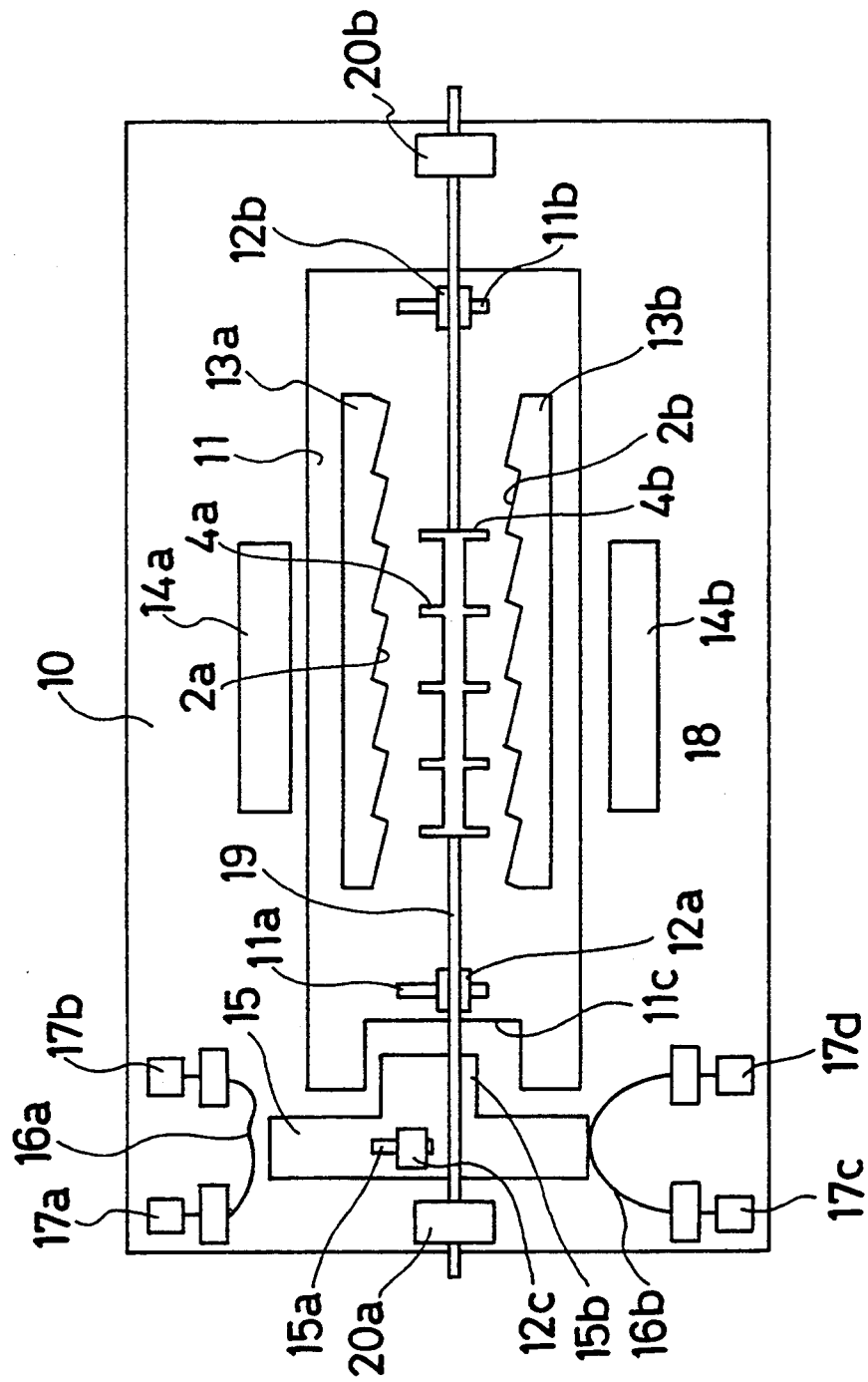
FIG. 5 is a plane view of vibration motor shown in FIG. 4.

Referring to FIGS. 4 and 5, there is illustrated the second embodiment of a vibration motor according to the present invention. A base member 10 in the form of a flat plate is mounted with a vibration board 11 which is formed with a pair of parallely spaced slots 11a and 11b in the vertical direction. A pair of pins 12a and 12b both of which are secured to the base member 10 are so received in the slots 11a and 11b, respectively, as to allow the vertical movement of the vibrating board 11.

On the vibration board 11, there are secured a first plate 13a and a second plate 13b between which a space is defined. Teeth 2a and teeth 2b are provided on inner surfaces of the first plate 13a and the second plate 13b, respectively. Each tooth 2a (tooth 2b) per se is of an asymmetric shape and the centrosymmetry is established between the first plate 13a and the second plate 13b with respect to the horizontal line. A third plate 18 is disposed between the first plate 13a and the second plate 13b so as to be extended in the horizontal direction. The third plate 18 is secured with a shaft 19 which is so supported by a pair of horizontally spaced bearings 20a and 20b as to be movable in the horizontal direction. The third plate 18 is provided with a plurality of upward projections 4a opposing the teeth 2a and a plurality of downward projections 4b opposing the teeth 2b.

At a left end of the vibration board 11, there is formed a notch 11c into which a projection 15b of a driving plate 15 is extended. A slot 15a which receives a pin 12c secured to the base member 10 is formed in the driving plate 15 so that the driving plate 15 may be movable in the vertical direction. The driving plate 15 is set to be located between a first shape memory effect alloy 16a and a second shape memory effect alloy 16b which are opposing each other in the vertical direction.

Both ends of the first shape memory effect alloy 16a (the second shape memory effect alloy 16b) are connected with corresponding electrodes 17a and 17b (17c and 17d). The base member 10 is provided with a pair of vertically spaced stoppers 14a and 14b for the prevention of an excess vertical movement of the vibration board 11.

With an application of an electric current to the second shape memory effect alloy 16b, due to its heat generation, the shape of the second shape memory effect alloy 16b is changed its shape into an arc-shaped one as shown in FIGS. 4 and 5, thereby raising the driving plate 15 which results in the illustrated condition. Under this condition as shown in FIGS. 4 and 5, if the vibration board 11 is vibrated in the vertical direction, the teeth 2a of the first plate 13a are brought into collision with the projections 4a. Due to the asymmetric shape of each tooth 2a, a leftward force is then applied to each projection 4a, resulting in the leftward movement of the third plate 18.

Upon current supply to the first first shape memory effect alloy 16a which is established concurrently with the current interruption to the second shape memory effect alloy 16b, the second shape memory effect alloy 16b is changed into the substantial bellows shape due to the resulting lowering of the temperature and is retracted from the driving plate 15. Contrary to this, the first first shape memory effect alloy 16a is formed into the arc-shaped structure which projects downwardly. Thus, the driving plate 15 is moved into its lowermost position. Under the resulting condition, if the vibration board 11 is vibrated in the vertical direction, the teeth 2b of the second plate 13b are brought into collision with the projections 4b. Due to the asymmetric shape of each tooth 2b, a rightward force is then applied to each projection 4b, resulting in the rightward movement of the third plate 18.

Instead of the shape memory effect alloy, other means such as a solenoid, a bimetal, a bellows and a diaphragm are available.

Third Embodiment

Figure 6:
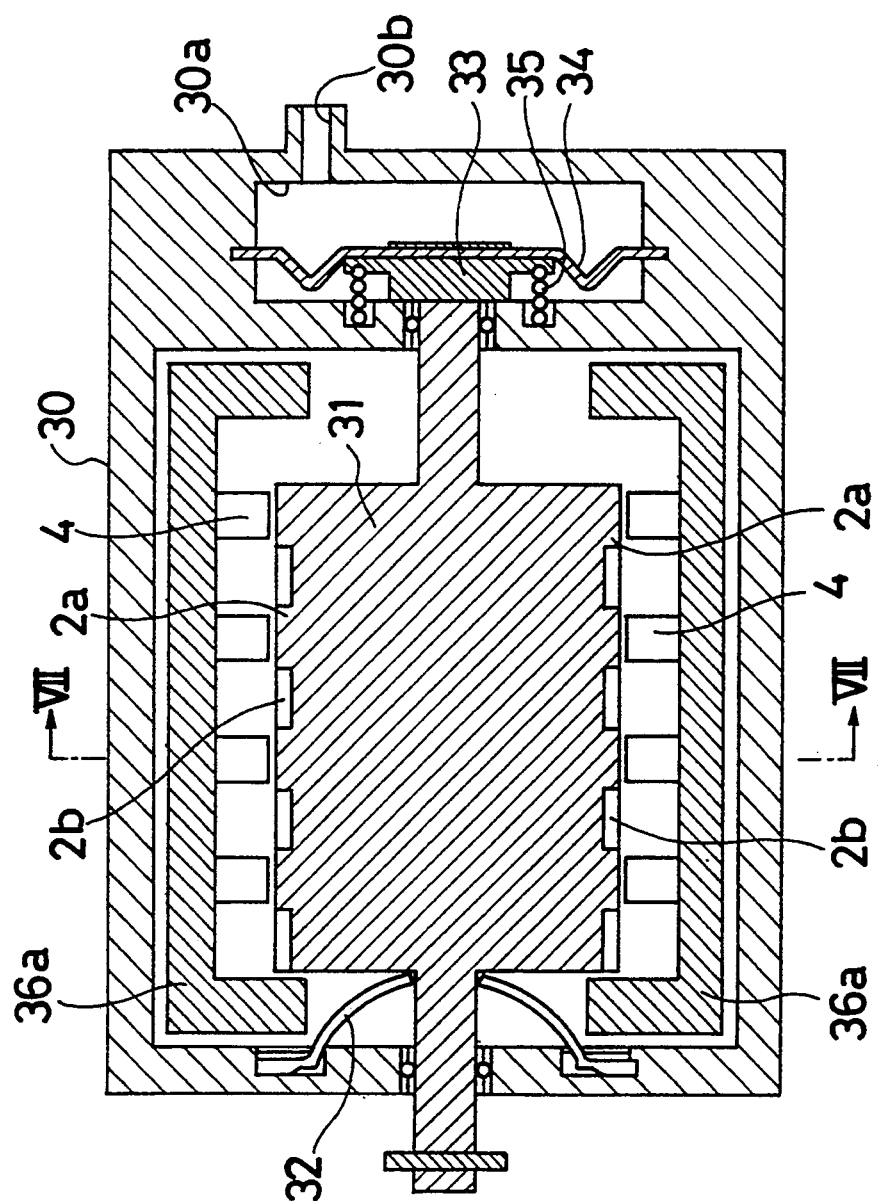
FIG. 6 is a vertical cross-sectional view of a third embodiment of a vibration motor in accordance with the present invention.
Figure 7:
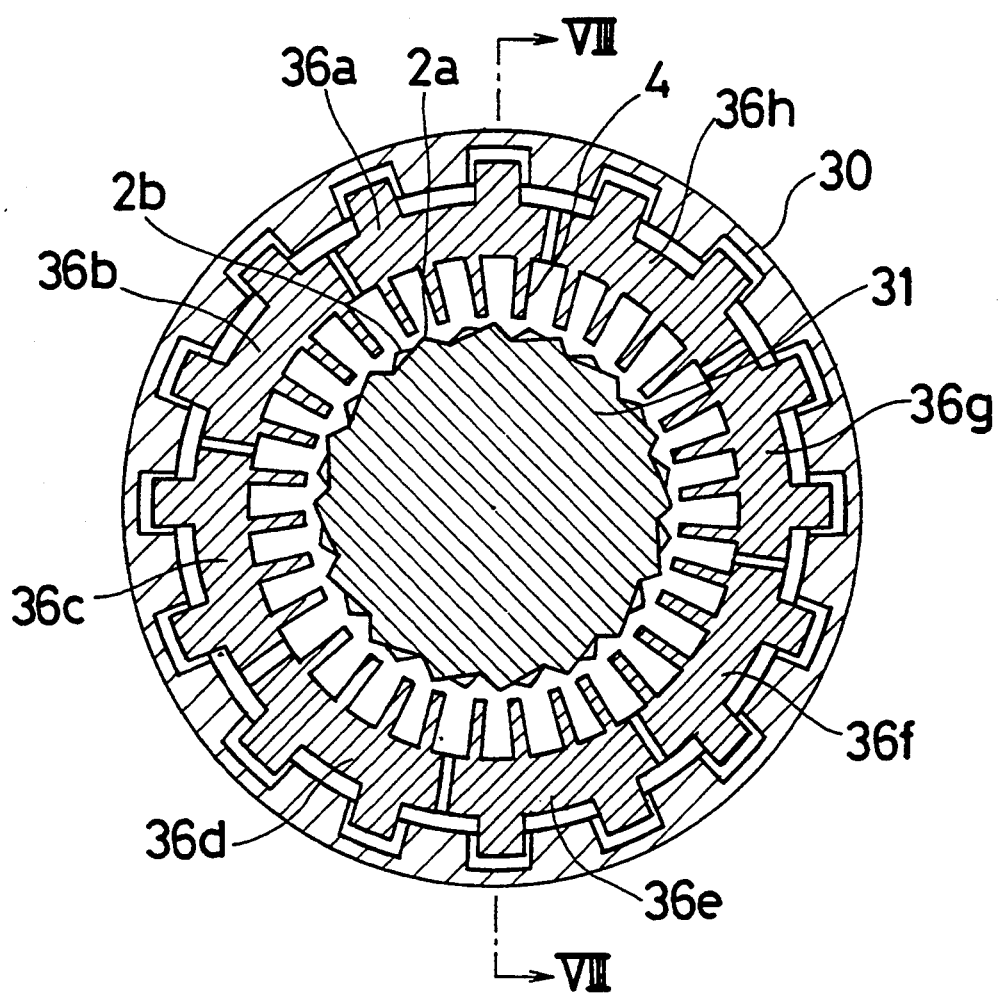
FIG. 7 is a cross-sectional view of a vibration motor taken along line VII—VII in FIG. 6.

In FIGS. 6 and 7, there is illustrated a vibration motor of the third embodiment according to the present invention. On a rotor 30, there are formed four gears each of which includes a plurality of circularly arranged teeth 2a. Each tooth 2a is of an asymmetric shape. Between two adjacent foregoing gears, another gear is interposed which includes a plurality of circularly arranged teeth 2b each of which is of an asymmetric shape. The centrosymmetry is established between the teeth 2a and the teeth 2b with respect to the radius of the rotor 31. The rotor 31 so supported by a frame 30 as to be movable in the circumferential direction and the axial direction.

Between the rotor 31 and an inner periphery of the frame 30, there are disposed eight segments 36a through 36h which are arranged in the circumferential direction for the establishment of a cylinder. Each segment is prevented from being rotated and is permitted to move in the axial direction. Each segment is provided with a plurality of inward projections 4 so that each projection is set to be able to oppose to only one of the teeth 2a and 2b. A leaf spring provided at a left side portion of the frame 31 in order to urge the rotor 31 in the rightward direction.

At a right inner portion of the frame 30, there is defined a reaction chamber 30a in which a diaphragm 34 is disposed for dividing the chamber 30a into two sections. The diaphragm 34 is secured with a retainer 33 opposing to a right end of the rotor 31. A spring 35 is used for urging the retainer 33 in the rightward direction. A right side section of the reaction chamber 31a is set to receive or discharge an amount of fluid under a high pressure through a port 30b.

When the fluid under the high pressure is supplied into the reaction chamber 31a, the diaphragm 34 is moved against the biasing force of the spring 35 in the leftward direction, which brings the leftward shift of the rotor 31 by the retainer 33 against the biasing force of the leaf spring 32. This condition is one shown in FIG. 6. Under this condition, the projections 4 are opposed to the teeth 2a and are brought into collision therewith upon vibration of each segment 36a/ . . . /36h in the radial direction, thereby rotating the rotor 31 in the clockwise direction in FIG. 7.

When the high pressure fluid is drained from the reaction chamber 31a, the retainer and the rotor 31 are moved in the rightward direction by the spring 25 and the leaf spring 33, respectively. Under this condition, the projections 4 are opposed to the teeth 2b and are brought into collision therewith upon vibration of each segment 36a/ . . . /36h in the radial direction, thereby rotating the rotor 31 in the counter-clockwise direction in FIG. 7.

Figure 8A:
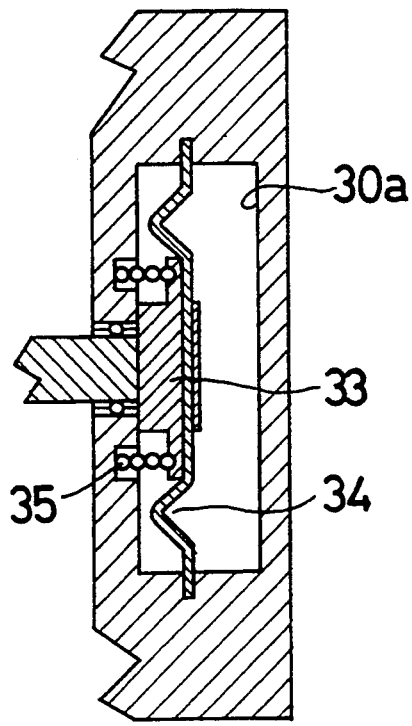
FIGS. 8(a) through 8(d) each of which is a cross-sectional view of a vibration motor taken along line VIII—VIII in FIG. 7.
Figure 8B:
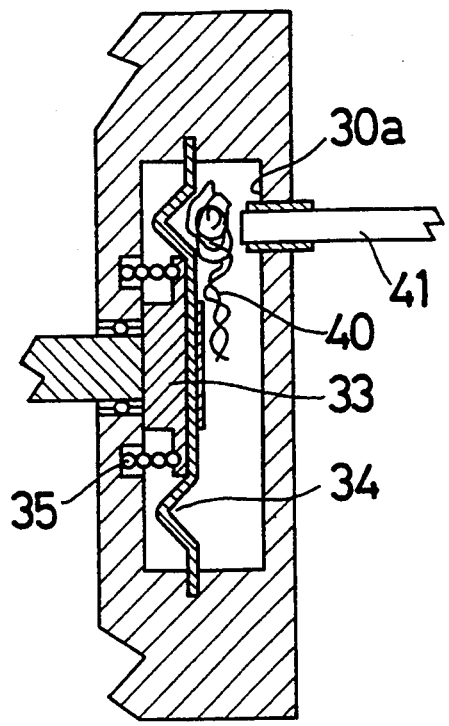
Figure 8C:
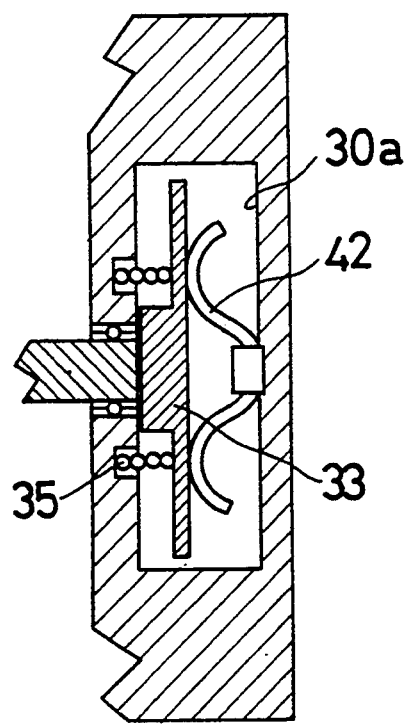
Figure 8D:
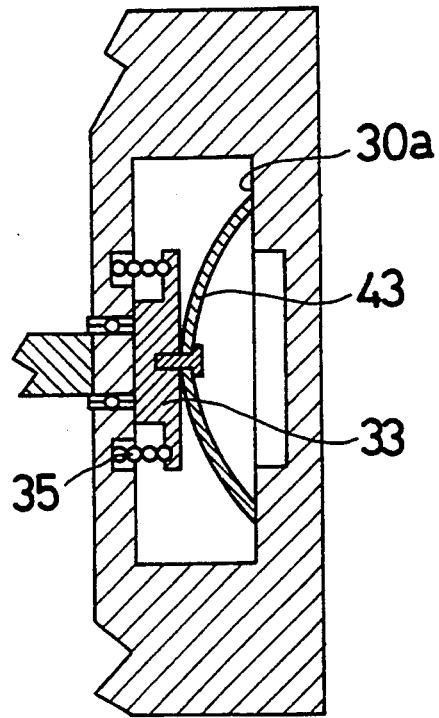
Figure 9:
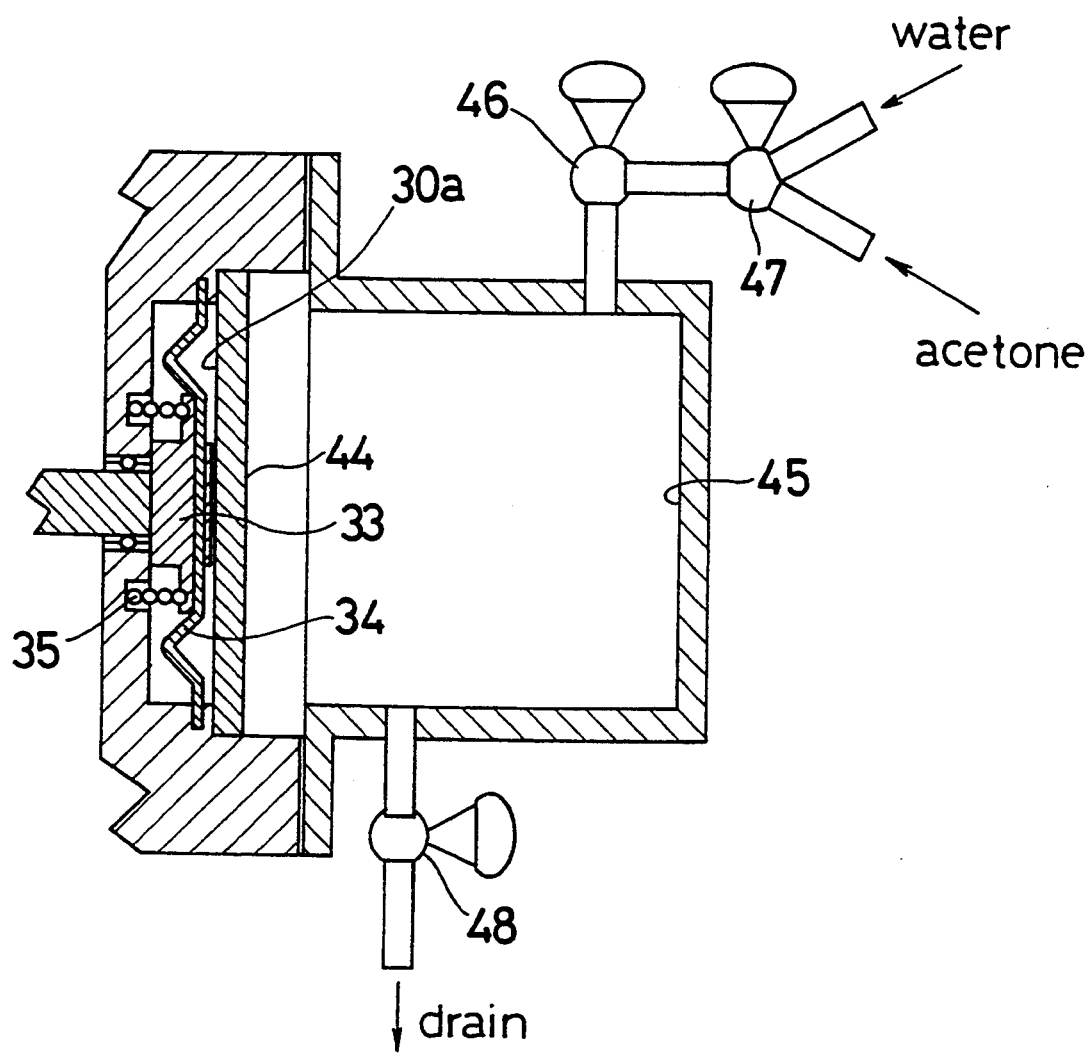
FIG. 9 is a cross-sectional view of a modification of a vibration motor shown in FIG. 6.

Regarding the third embodiment, additional modifications are proposed. The first modification is, as shown in FIG. 8(a), to seal a gas with a low boiling point in the reaction chamber 30a. In this case, at a low (high) temperature, the rotor 31 is set to be rotated in the counter-clockwise (clockwise) direction. The second modification is, as shown in FIG. 8(a), to provide a fiber which is of highly heat absorption in addition to the device shown in FIG. 8(a). In this embodiment, evaporation and liquefaction are set to be established by the introduction and the interruption of light through an optical fiber 41, respectively. Instead of the fluid in FIG. 8(a), a shape memory effect alloy 42 as shown in FIG. 8(c) or a bimetal 43 as shown in FIG. 8(d) is available. In FIG. 9, the fifth modification of the third embodiment is illustrated. In this modification, an amount of polyvinylealcohl polymer is stored in a reaction chamber 45. When the polyvinylealcohl polymer is reacted with an amount of acetone to be supplied via a valve 46 and a switching valve 47, the volume of the reaction chamber 45 is reduced, resulting in the rightward movement of a sliding plate 44. After the acetone is drained from a drain valve 48 while the valve 46 is closed, if an amount of water is supplied into the reaction chamber 45 with opening the valve 46 and changing-over the valve 47, the polyvinylealcohl polymer is gain inflated, thereby moving the sliding plate 44 in the leftward direction.

Fourth Embodiment

Figure 10:
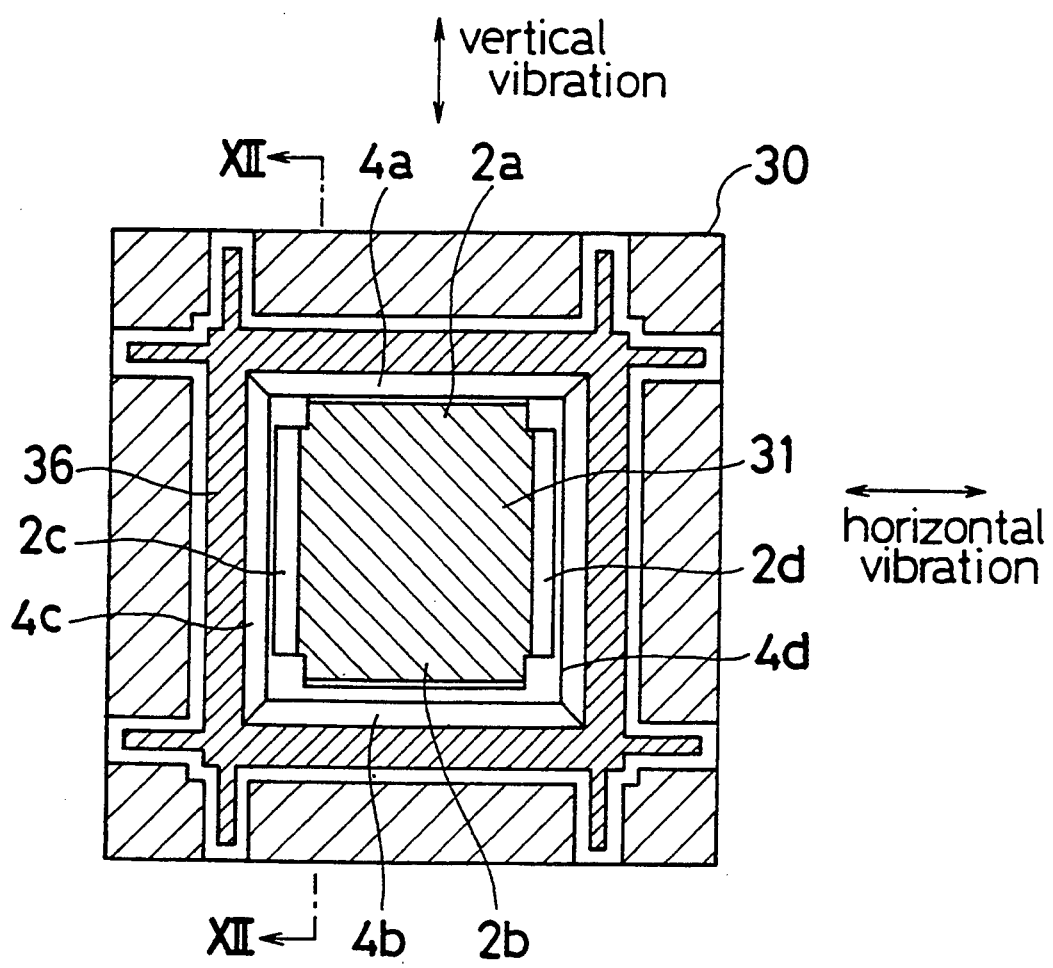
FIG. 10 is a horizontal cross-sectional view of a fourth embodiment of a vibration motor in accordance with the present invention.
Figure 11:
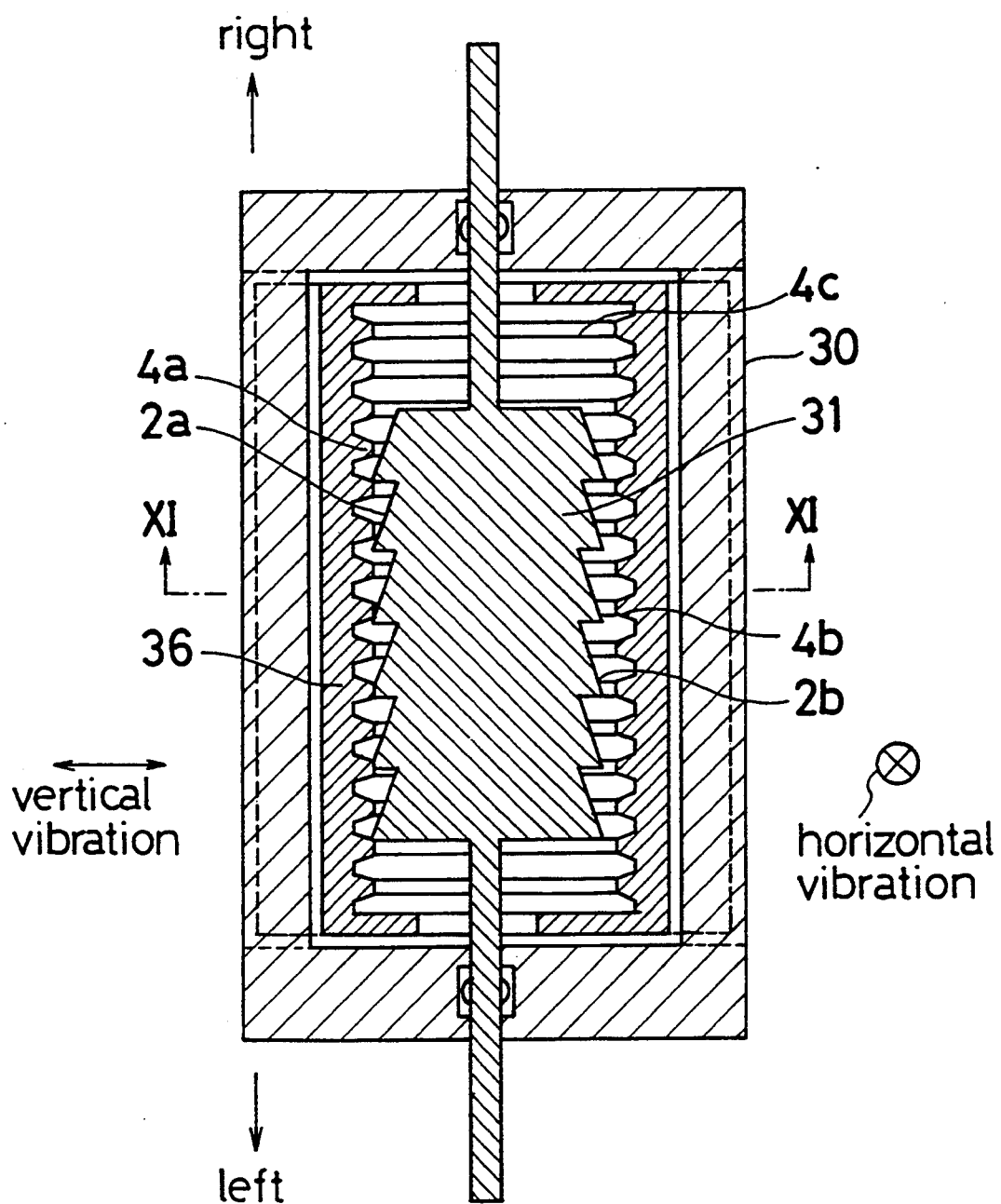
FIG. 11 is a vertical cross-sectional view of a vibration motor taken along line XII—XII in FIG. 10.
Figure 12:
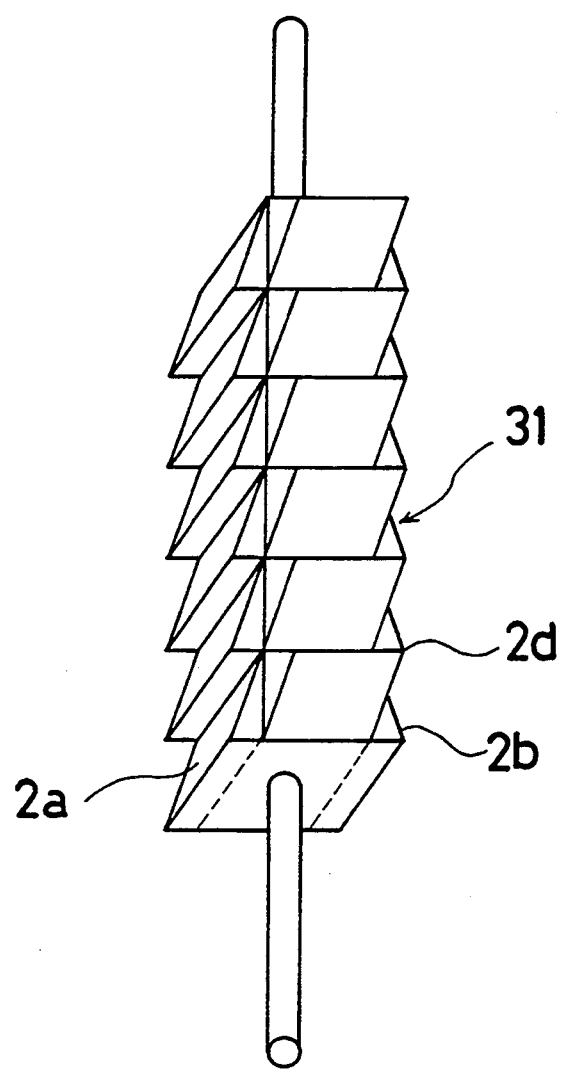
FIG. 12 is a perspective view of a reciprocating member of a vibration motor shown in FIG. 10.

As shown in FIGS. 10 through 12, a reciprocating member 31 has opposed surfaces on which teeth 2a and teeth 2b are provided respectively. The teeth 2a are symmetric with the teeth 2b with respect to an axis of the reciprocating member 31. On other opposed surfaces of the reciprocating member 31, there are provided teeth 2c and teeth 2d respectively both of which are symmetric with each other with respect to an axis of the reciprocating member 31. The centrosymmetry is established between the teeth 2a and the teeth 2c. The reciprocating member 31 is so supported by a frame 30 as to be movable in the right-left direction and is restricted its rotation. Between the frame 30 and the rotor 31, there is interposed a rectangular vibrating body 36 having therein four inner surface sides which are provided with teeth 4a, 4b, 4c and 4d, respectively. The vibrating body 36 is movable in the vertical and horizontal directions but is not movable in the right-left direction.

Upon vertical movement of the vibrating body 36, the teeth 4a and 4b are brought into collision with the teeth 2a and 2b, respectively, thereby moving the reciprocating member 31 in the leftward direction. In case of the horizontal movement of the vibrating body 36, the teeth 4c and 4d are brought into collision with the teeth 2c and 2d, respectively, thereby moving the reciprocating member 31 in the rightward direction.

It should be apparent to one skilled in the art that the abovedescribed embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A motor device, comprising:
    an annular member movable linearly in a direction normal to an axis of the annular member in response to an applied external reciprocal vibratory pressure;
    a plurality of equally pitched inwardly extending projections positioned at an inner annulus edge of the annular member, the distal end of each of the projections being bent obliquely to the radii of the annular member;
    a rotatable shaft member having an axis and mounted coaxially within the annulus of the annular member; and
    a plurality of equally pitched outward projections extending in radial alignment with a radial line of the rotatable shaft member, the outward projections being spaced from the inward projections, the inward extending projections being brought into engagement with the outward extending projection in response to the external reciprocal vibratory movement of the annular member, the vibratory engagement rotating the shaft member in a single direction.

2. A motor device according to claim 1 wherein each of the inwardly extending projections is in the form of a bimetal temperature sensitive device.

3. A motor device comprising:
    a first member having a first plurality of equally pitched projections, said member being reciprocally vibratable;
    a second member having an axis, mounted adjacent the first member, the second member having a second plurality of equally pitched projections opposing and spaced from the first plurality of projections;
    at least the plurality of projections of one of the first and second members each having a surface that extends obliquely to corresponding opposing surfaces of the plurality of projections of the other of the first and second members;
    the first member, the second member and the projections being disposed and dimensioned for the oblique surfaces of the projections to engage the opposing projections to move the second member in one direction in response to the vibratory reciprocation of the first member.

4. A motor device according to claim 3 further comprising a base member, wherein the first member includes a horizontally extended shaft with a plurality of vertical projections mounted to the base member so as to be reciprocally vibratable in a radial direction, the second member being movably mounted to the base member to move in the direction of the axis of the second member direction the plurality of projections being longitudinally disposed and a shape memory effect alloy in periodic engagement with the longitudinal projections disposed to cause vibratory reciprocal movement of the shaft.

5. A motor device according to claim 3 wherein the first member is formed into an annulus having a plurality of circumferentially arranged segments, said segments being reciprocally vibratable in the radial direction in response to external vibration, the second member includes a rotatable shaft, and the plurality of projections on the rotatable shaft each being asymmetric with respect to a radial line of the rotatable shaft and the plurality of projections of the second member being provided at an inner side of the annulus with each projection of the annulus being opposed to a corresponding projection of the rotatable shaft, each projection of the annulus being engagable and in radial alignment with the rotatable shaft.

6. A motor device according to claim 3 wherein the first member is formed into a rectangular body, the second member is a cylinder having a rectangular cross section, a first plurality of projections are provided on first opposite sides of the rectangular body, a second plurality of projections are provided on second opposite sides of the rectangular body adjacent to the first opposite sides of the rectangular body.

7. The device of claim 3 wherein the first member is annular and is reciprocable in a radial direction.

8. The device of claim 8 wherein the second member rotates in one direction.

9. A motor device, comprising:
    an annular member movable linearly in a direction normal to an axis of the annular member in response to an applied external reciprocal vibratory pressure;
    a plurality of equally pitched inwardly extending bi-metallic projections positioned at an inner annulus edge of the annular member; the distal end of each of the projections being bent in one direction obliquely to the radii of the annular member;
    a rotatable shaft member having an axis and mounted coaxially within the annulus of the annular member; and
    a plurality of equally pitched outward projections extending in radial alignment with a radial line of the rotatable shaft member, the inward extending projections being brought into engagement with the outward extending projection in response to the external reciprocal vibratory movement of the annular member, the vibratory engagement rotating the shaft member in the one direction; and wherein the bimetal projections bend in the opposite oblique direction in accordance with a predetermined temperature for reversing rotation of the shaft member to turn in the opposite direction.

10. A motor device comprising:
- a first member having a first plurality of equally pitched projections, said member being reciprocally vibratable;
- a second member having an axis, mounted adjacent the first member, the second member having a second plurality of equally pitched projections opposing the first plurality of projections;
- at least the plurality of projections of one of the first and second members each being of bimetal and having a surface that extends obliquely to corresponding opposing surfaces of the plurality of projections of the other of the first and second members;
- the first member, the second member and the projections being disposed and dimensioned for the oblique surfaces of the bimetal projections to engage the opposing projections to move the second member in one direction in response to the vibratory reciprocation of the first member, wherein the bimetal projections bend in the opposite oblique direction in accordance with a predetermined temperature for reversing rotation of the shaft member to the opposite direction.

* * * * *

UNITED STATES PATENT AND TRADEMARK OFFICE
CERTIFICATE OF CORRECTION

PATENT NO. : 5,345,767
DATED : September 13, 1994
INVENTOR(S) : Mitsuhiro Ando et al.

It is certified that error appears in the above-indentified patent and that said Letters Patent is hereby corrected as shown below: On title page, item [73], Assignee should read --Aisin Seiki Kabushiki Kaisha and Iwao Fujimasa--.

Assignee address should read --Kariya, Japan--.

Signed and Sealed this

Seventeenth Day of September, 1996

*Attest:*

BRUCE LEHMAN

*Attesting Officer*     *Commissioner of Patents and Trademarks*